Sept. 6, 1966

D. W. BAXTER ETAL 3,271,589

STROBED SENSE AMPLIFIER

Filed Dec. 9, 1963

INVENTORS
DUANE W. BAXTER
BRUCE C. FELTON
ANTON WERNER
JAMES R. WINNARD

BY Frederick D. Poag
ATTORNEY

United States Patent Office 3,271,589
Patented Sept. 6, 1966

3,271,589
STROBED SENSE AMPLIFIER

Duane W. Baxter, Putnam Valley, Bruce C. Felton, Saugerties, Anton Werner, Greenville, and James R. Winnard, Marbletown, N.Y., assignors to International Business Machines Corporation, New York, N.Y., a corporation of New York Filed Dec. 9, 1963, Ser. No. 328,823
9 Claims. (Cl. 307—88.5)

This invention relates to signal detecting and gating circuits and more particularly to a circuit which is adapted for use as a sense amplifier in memory systems and similar employments.

In many systems a circuit is needed to detect and amplify signals in a strobe-sampled or gated manner, while rejecting relatively high amplitude noise signals at other times. This detection and discrimination becomes more difficult if the input signals can occur in both positive and negative directions, such as is the case with the output signals of many coincident current memory matrix devices.

A typical prior art practice for achieving the above described detection and discrimination is to apply the signals to a differential preamplifier, biasing off the undesired noise signals, and then converting the wanted bipolar signals to a unipolar output and finally combining the output with a strobe pulse by means of an "AND" circuit. Typically such circuits consist of five or more transistors or vacuum tubes each associated with one or several other components, and consume standby power from one or more power supplies in addition to the power derived from the strobe pulse.

With the development of the tunnel diode, new circuit possibilities presented themselves. For example, a circuit entitled, "Double Action Tunnel Diode Strobe," was published at pages 23, 24, vol. 4, No. 6 of the IBM Technical Disclosure Bulletin (November 1961).

In accordance with the present invention a strobed sense amplifier circuit is provided which requires only four components, namely, two tunneled diodes, a transformer and a resistor, and utilizes no power supply other than the strobe supply itself. It discriminates against not only common mode noise but very high amplitude signal line noises occurring at other than strobe time and is responsive to provide an identical output irrespective of the polarity of the sense line input at strobe time.

Accordingly, it is a primary object of the invention to provide a circuit of the class described characterized by unusual simplicity and efficiency.

Another object of the invention is to provide a circuit as aforesaid which is sensitive to input pulses of either polarity to yield an output which is independent of the polarity of the input.

Still another object of the invention is to provide in a circuit as aforesaid on unusual degree of noise rejection capability.

Yet another object of the invention is to provide an improved circuit as afore-described which operates as a latching gate which continues its output during the continuance of the strobe signal applied thereto but drops that output at the end of the strobe without requirement of any reset signal.

The foregoing and other objects, features and advantages of the invention will be apparent from the following more particular description of preferred embodiments of the invention, as illustrated in the accompanying drawings.

Figure 1:
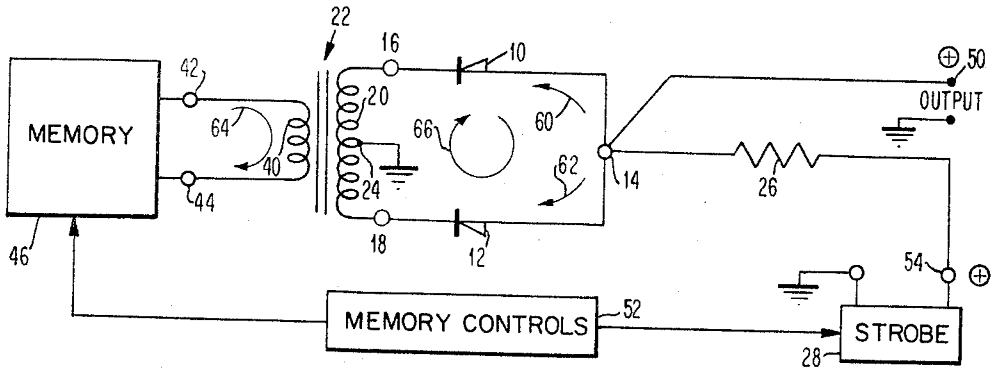
Figure 2:
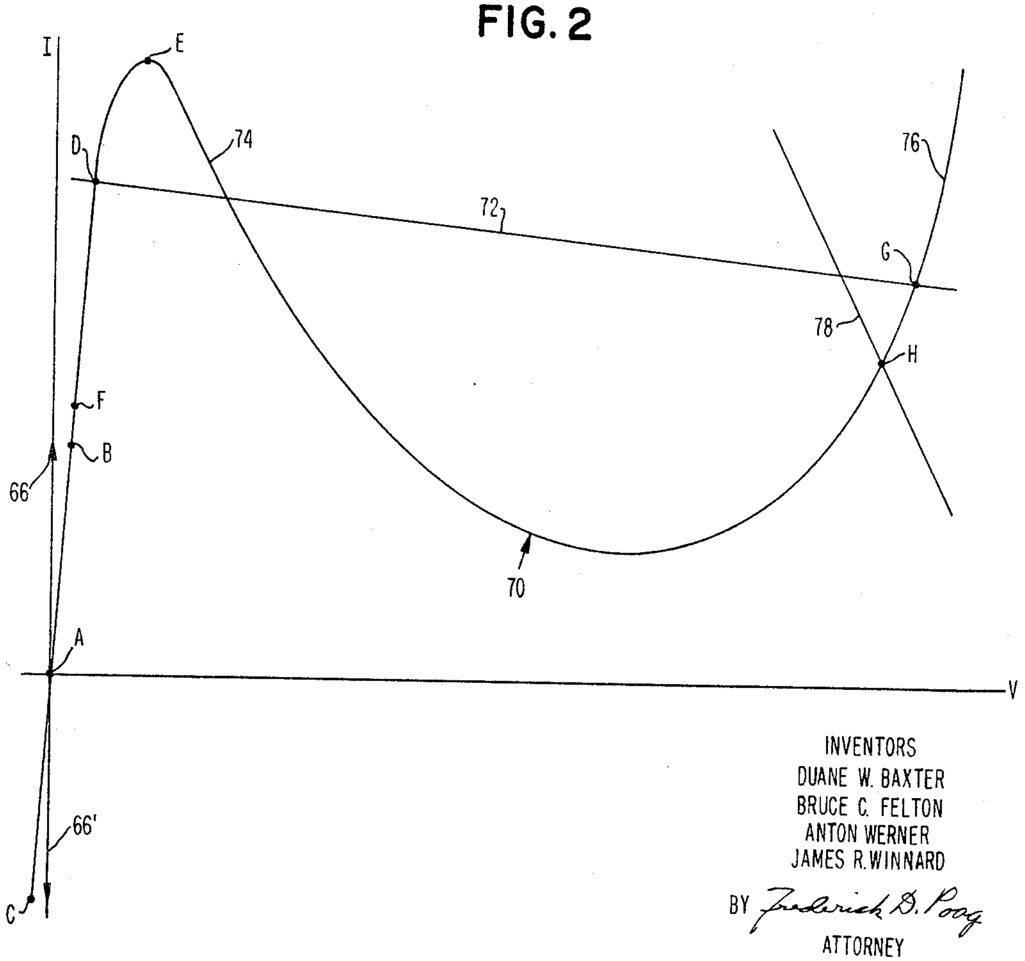

FIG. 1 is a schematic diagram of a gate circuit of the invention, connected as an output sense amplifier for a memory device and provided with a suitable strobe power source for energization in cooperation therewith; and FIG. 2 is an operating diagram applicable to the circuit arrangement of FIG. 1.

Referring more particularly to FIG. 1, the illustrated gate circuit of the invention comprises a pair of tunnel diodes 10, 12 connected in parallel between a common terminal 14 and the opposite end terminals 16, 18 of the secondary winding 20 of a transformer 22. The transformer winding 20 has a center tap terminal 24 which is common to the two parallel circuit paths through the diodes 10, 12 as shown. Strobe input power is applied through a load resistor 26 to the common terminal 14 from any suitable source as indicated at 28. The return from the common center tap terminal 24 to the strobe supply 28 can be through ground, as shown.

The signal input to the circuit is by means of the primary winding 40 of the transformer 22, which may be connected via terminals 42, 44 to the signal source, such as a sense line output of a memory array 46. The memory 46 may be of any of many conventional kinds which, for example, may include means (not shown) which are arranged to sample or "read" a memory element within the array 46 for producing a signal at the terminals 42, 44 in accordance with the data storage state of the element. Particularly in the case of certain well known coincident current addressed memory schemes, the polarity of that signal may be irrelevant a logical "ONE" being represented by a signal of either polarity and a logical "ZERO" being represented by the absence of the signal.

In its illustrated employment, it is the purpose of the circuit of the present invention to sense this useful output at terminals 42, 44 at a particular time in coordination with operation of the memory system array 46, and to thereupon yield a corresponding output at its output terminal 50. Accordingly, means are employed for coordination of the operation of the strobe supply 28 in coordination with the operation of the inquiry circuits of the memory 46. For example, the strobe supply 28 and the memory array 46 may be operated under supervision of central control means 52 of the memory system.

Arrows 60, 62 indicate the directions of the strobe current which, in the absence of a sense signal in primary 40, flows in equal parts from the common terminal 14 through the respective diodes 10, 12 and respective halves of the secondary winding 20 to the common ground return terminal 24. The value of this current is determined by the voltage of the strobe pulse supplied at terminal 54 of the strobe source 28, the value of the strobe load resistor 26, and the drop across the respective diode 10, 12. Since these currents 60, 62 proceed in relatively opposite directions through the winding 20, from the terminal 16 to the terminal 24 and from the terminal 18 to the terminal 24, respectively, there is no net flux produced in the core of the transformer.

When a current, such as indicated at 64, flows in the primary 40 of the transformer 22, a voltage is induced in the secondary 20 by ordinary transformer action which tends to set up a corresponding current 66 in a closed circuit path defined by secondary 20, terminal 16 thereof, tunnel diode 10, terminal 14, tunnel diode 12 and terminal 18 of the secondary 20. In the case of the current direction indicated by the arrow 66, it will be seen that this current flows backward through one tunnel diode 10 and forward through the other one 12; had the current applied to the primary 40 been in the opposite direction, the current 66 would be in the opposite direction, that is forwardly through diode 10 and backwardly through diode 12. As will be discussed below in reference to FIG. 2, the parameters of the circuit are such that the strobe currents 60, 62 alone and the sense signals such as indicated at 66 alone operate the tunnel diodes 10, 12 in their essentially linear low impedance regions so that there is no interaction between the two diodes and the potential seen at 14 remains close to ground. Accordingly, there is then no substantial output at terminal 50.

However, when the strobe signal is applied at terminal 54 during the application of a sense input to the primary 40, the current components combine to drive one of the tunnel diodes into its negative resistance region of operation and the resulting shift of strobe current to the other tunnel diode drives it to its negative region, so that both diodes very quickly assume a new stable point of operation with a substantial voltage across the diodes appearing as an output at terminal 50. The direction of the input applied to primary 40 has no effect beyond determining the direction of the current component 66 resulting therefrom in the secondary circuit and thus which of the two diodes 10, 12 is the first to switch; thus it has no effect whatsoever on the output signal at terminal 50.

This operation is illustrated in FIG. 2 wherein the current-voltage characteristic curve 70 applies to each of the diodes 10, 12. When there is neither a current input signal to the primary 40 nor a strobe voltage signal applied to the terminal 50 the diodes conduct no current and are quiescent at stable point A on the curve. When current 64 flows in primary 40 in response to a signal applied to terminals 42, 44 from the memory device 46, the resulting current 66 flows forwardly through tunnel diode 12 to shift its operating condition to point B on curve 70, and backwardly through diode 10, as indicated at 66′ to shift its operating condition to point C on the curve.

When a strobe pulse is applied alone the resulting currents 60, 62 flow forwardly through the respective tunnel diodes 10, 12 to shift their operating condition to point D, the first encountered intersection of the curve 70 with the load line 72 determined largely by the voltage applied at the strobe input terminal 54 and the ohmic value of the resistor 26.

It will be seen that, due to the near linearity of the portion B–C of the characteristic curve involved in the excursion resulting from a sense signal input alone and the otherwise symmetrical nature of the circuit traversed by the resulting current 66, there is virtually no output at terminal 50 resulting from a sense input at terminals 42, 44 alone. On the other hand, since the excursion to point D resulting from a strobe pulse alone is in the first, steep portion of the characteristic curve, the output at terminal 50 (the V-axis component of the excursion A–D) is negligible.

However, if the two inputs occur together, the excursions A–B and A–D tend to be superimposed upon one another so that the peak point E of one of the diodes (diode 12 for the current directions assumed) is exceeded whereby that diode goes into the negative resistance portion 74 of its characteristic curve. This transient operation of diode 12 proceeds rapidly (to the right on the diagram) toward the minimum conduction point on the curve.

Accordingly, this diode 12 can no longer accept its share of the strobe current and some of that share is forced through the other diode 10. This diode 10, which would otherwise be operating at a point F equivalent to its strobe current component A–D minus sense current component A–C, is now itself forced toward and over the operating peak point E by the additional strobe current it must pass. Since the switching characteristics of tunnel diodes are very fast, the operation of this circuit, for both diodes, proceeds rapidly toward the intersection G of the load line 72 and the next positively sloped portion 76 of the characteristic curve 70, plus and minus relatively small voltage components arising from the sense signal applied to terminals 42, 44. Depending on the nature of the output utilization circuit connected to output terminal 50, a further load line such as the line 78 may be encountered so that the actual load line operating point may be reduced to point H. Line 78 represents the effect of base current drawn by a transistor (not shown) connected to output 50, for example.

When the sense current 64 terminates, the operating points of the two diodes each settle to point H so that an output continues to be seen at terminal 50 so long as the strobe current persists. In this way the circuit has a latching characteristic. Once the strobe current is terminated the operation of the tunnel diodes return to point A.

It will be understood that a number of factors, some quite complicated, enter into the exact nature of the above described switching transients. When the balance of currents through the two diodes is disturbed not only by the sense current but also by the "refusal" of first one diode and then the other to accept current, the potential at terminal 14 rises very abruptly. Also, as the first diode switches and tends to arrest the circulating current 66, the potential at terminals 42, 44 tends to increase, in accordance with the impedance characteristics of the signal source in array 46. Perhaps most significantly, the inductance seen at winding 20 has the effect of attempting to force continuance of current through the first diode to switch (e.g. diode 12) as that diode starts to switch, and thus impresses a higher switching potential across that diode. Thus, the inductance, by acting to aid switching of the first diode, acts indirectly to aid in switching the second. Accordingly it appears that the transformer 22 acts not only as a D.C. decoupling and impedance matching device, but as an aid to rapid and positive operation of the circuit. The circuit of the invention is adaptable to widely varying operating conditions and specific component choices; the following data for one example are typical:

*Table A*

| | |
|---|---|
| Loaded voltage at terminals **42, 44** at strobe time (no strobe) | Logical "1"—±12 mv. Logical "0"—±3 mv. |
| Secondary current **66** at strobe time (no strobe) | Logical "1"—200 μa. Logical "0"—50 μa. |
| Impedance of sense line of memory **46** as seen form terminals **42, 44** | 6 ohms, resistive. |
| Apparent resistance of current loop **66** with one diode near peak E of diode characteristic | 150 ohms. |
| Strobe Voltage at terminal **54** | 4.7 v. (Zener diode fixed). |
| Strobe Voltage rise time | 50 nanosec. |
| Load resistor **26** | 6100 ohms. |
| Current axis (I) intercept of load line **72** | 380 μa. |
| Diodes **16, 18** | Hoffman 1N2928A or Hoffman HT90A. |
| Peak E of diode characteristic | 470 μa. (approx. 67 mv.). |
| Transformer **22**: | |
| Toroidal core—Stackpole Cermag **11–A** | .120 in. O.D., .07 in. I.D., .060 in. thick. |
| Primary—10 turns | #40 copper magnet wire. |
| Secondary—50 turns, center tapped | #40 copper magnet wire. |
| Secondary inductance—25 | microhenries, approx. |

It will be understood that the transformer turns ratio, diode selection, load line determination and other factors in the circuit of the invention can be and are changed to suit the needs of various employments of the circuit. It has been found that with these factors properly chosen and adjusted, reliable discrimination between signal and noise can be achieved where the worst case signal-noise ratio at strobe time is as high as three-to-two. Since the tunnel diodes are highly temperature stable, and the other circuit elements are susceptible to close control, this critical signal sensitivity is stable over wide temperature ranges.

Moreover, since the strobe signal can be timed accurately with respect to the operation of the memory array 46, the strobe time can be set to occur at relatively noise-free times. At other times, large noise signals may actually cause diode switching action in the circuit, but without the strobe input there is no latching action and therefore the circuit returns quickly to its quiescent point A on the diode operating curve 70. Such momentary, unlatched switching transients characteristically last for such a short time that the utilization circuit connected at output terminal 50 can easily be made insensitive to them; for example, they may have a duration which is short compared to the turn-on time of a transistor connected to the output. Moreover, switching transients stemming from noise at the signal input without any strobe signal would ordinarily lack enough energy to bring the operation of a tunnel diode very far out along the ascending portion 76 of its characteristic curve.

It will be understood that the output from the circuit may be taken at a variety of places in the circuit, the usual characteristics to be measured in determining whether the circuit has switched and latched, that is whether a useful input has been detected, being impedance change through the tunnel diodes or the potential thereacross. Accordingly, it is frequently convenient to take the output of the circuit from a tap in the load resistor 26, particularly where the output is to be connected to the base of a transistor operating in grounded-emitter configuration. In such a circuit the fact that the output is taken from a tap in the load resistor and have the effect of biasing the base of the transistor forwardly to an extent by operation of the strobe source energy before the tunnel diode circuit switches, for pre-conditioning the transistor for more rapid and positive response to the circuit. Such an output point is sometimes used also to take advantage of the fact that the load resistor 26 then becomes a divider with respect to noise signals when the strobe output terminal 54 is at ground.

It will be seen that the circuit of the invention is simple, reliable, and adaptable to various employments. Since the power for operation of the circuit comes from the strobe source, there is no quiescent or standby power dissipation within the sense amplifier of the invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrical signal sensing apparatus comprising,
an electrical current signal source,
a strobe electrical current source,
control means connected to actuate said sources concurrently,
and gating means responsive to concurrent outputs from said sources, said gating means comprising
a pair of tunnel diodes connected in parallel across said strobe source for being forward biased by the output thereof,
the parallel connection of said diodes comprising a circuit loop including said diodes in opposite polarity orientation with respect to each other in said loop,
means adapted to introduce a circulating current component in said circuit loop corresponding to said output of said signal source,
and output means connected to be sensitive to the impedance state of said diodes.

2. An electrical signal sensing apparatus comprising,
an electrical current signal source,
a strobe electrical current source,
control means connected to actuate said sources concurrently,
and gating means responsive to concurrent outputs from said sources, said gating means comprising
a pair of tunnel diodes connected in parallel across said strobe source for being forward biased by the output thereof,
the parallel connection of said diodes comprising a circuit loop including said diodes in opposite polarity orientation with respect to each other in said loop,
reactive means adapted to introduce a circulating current component in said circuit loop corresponding to said output of said signal source,
and output means connected to be sensitive to the impedance state of said diodes.

3. An electrical signal sensing apparatus comprising,
an electrical current signal source,
a strobe electrical current source,
control means connected to actuate said sources concurrently,
and gating means responsive to concurrent outputs from said sources, said gating means comprising
a pair of tunnel diodes connected in parallel across said strobe source for being forward biased by the output thereof,
the parallel connection of said diodes comprising a circuit loop including said diodes in opposite polarity orientation with respect to each other in said loop,
transformer means connected to introduce a circulating current component in said circuit loop corresponding to said output of said signal source,
and output means connected to be sensitive to the impedance state of said diodes.

4. An electrical signal sensing apparatus comprising,
an electrical current signal source,
a strobe electrical current source,
control means connected to actuate said sources concurrently,
and gating means responsive to concurrent outputs from said sources, said gating means comprising
a pair of tunnel diodes connected in parallel across said strobe source for being forward biased by the output thereof,
the parallel connection of said diodes comprising a circuit loop including said diodes in opposite polarity orientation with respect to each other in said loop,
transformer means comprising primary means connected to said signal source and secondary means connected in said loop,
and output means connected to be sensitive to the impedance state of said diodes.

5. An electrical signal sensing apparatus comprising,
an electrical current signal source,
a strobe electrical current source,
control means connected to actuate said sources concurrently,
and gating means responsive to concurrent outputs from said sources, said gating means comprising
a pair of tunnel diodes connected in parallel across said strobe source for being forward biased by the output thereof,
the parallel connection of said diodes comprising a circuit loop including said diodes in opposite polarity orientation with respect to each other in said loop,
transformer means comprising primary means connected to said signal source and secondary means connected in said loop,
and output means connected across said diodes.

6. An electrical signal sensing apparatus comprising,
an electrical current signal source,
a strobe electrical current source,
control means connected to actuate said sources concurrently,
and gating means responsive to concurrent outputs from said sources, said gating means comprising
transformer means comprising a primary winding connected across an output of said signal source, said transformer means having secondary winding means having a center terminal defining respective halves thereof, a pair of tunnel diodes connected in series with said respective halves of said secondary winding means in parallel circuit paths across said strobe source for being forward biased by the output of said strobe source, the parallel connection of said diodes comprising a circuit loop including said diodes in opposite polarity orientation with respect to each other in said loop, and output means connected to be sensitive to the impedance state of said diodes.

7. Apparatus in accordance with claim 6, wherein said output means is connected across said parallel circuit paths.

8. Apparatus in accordance with claim 7, wherein said gating means comprises a common load resistor by which said strobe source is connected to said parallel circuit paths.

9. An electrical signal sensing circuit comprising, transformer means comprising a primary winding, comprising an input for the circuits, and secondary winding means responsive thereto, said secondary winding means having a center terminal, a circuit operating power supply connected to said center terminal and including load resistor means, a pair of tunnel diodes connected in parallel between said supply and the opposite ends of said secondary winding means to be energized in their forward directions by the power of said supply, and output means connected between said center terminal and said load resistor means to be sensitive to the impedance state of said diodes.

No references cited.

ARTHUR GAUSS, *Primary Examiner.*

J. BUSCH, *Assistant Examiner.*